United States Patent [19]

Ermacora et al.

[11] Patent Number: 4,694,640
[45] Date of Patent: Sep. 22, 1987

[54] MOWING MACHINE FOR CUTTING HAY AND CEREAL GRASS

[75] Inventors: Rino Ermacora, Ottersthal; Patrice Jehl, Imbsheim, both of France

[73] Assignee: Kuhn S.A., Saverne, France

[21] Appl. No.: 15,561

[22] Filed: Feb. 13, 1987

Related U.S. Application Data

[63] Continuation of Ser. No. 716,178, Mar. 26, 1985, abandoned.

[30] Foreign Application Priority Data

Nov. 12, 1984 [FR] France ............... 84 17351

[51] Int. Cl.⁴ ............................................ A01D 34/66
[52] U.S. Cl. ................................. 56/16.4; 56/13.6; 56/315
[58] Field of Search ............... 56/13.6, 16.4, 17.4, 56/192, 218, 228, 315

[56] References Cited

U.S. PATENT DOCUMENTS

| | | | |
|---|---|---|---|
| 1,197,550 | 9/1916 | Salter | 56/315 |
| 1,232,681 | 7/1917 | Harmsen | 56/315 |
| 2,625,784 | 1/1953 | Kelsey | 56/13.6 X |
| 2,782,585 | 2/1957 | Hervey | |
| 3,772,865 | 11/1973 | Ruprecht et al. | 56/192 |
| 3,893,283 | 7/1975 | Dandl | 56/228 X |
| 3,979,889 | 11/1976 | Vansteelant | |
| 4,117,653 | 10/1978 | Tarver, Jr. | 56/192 X |
| 4,142,349 | 3/1979 | HellKuhl et al. | 56/14.4 |
| 4,166,350 | 9/1979 | Werner | 56/13.6 X |
| 4,182,099 | 1/1980 | Davis et al. | 56/16.4 |
| 4,269,019 | 5/1981 | Strobel | 56/13.6 X |
| 4,502,267 | 3/1985 | Klinner | 56/16.4 X |

FOREIGN PATENT DOCUMENTS

| | | |
|---|---|---|
| 0074695 | 3/1983 | European Pat. Off. . |
| 0084293 | 7/1983 | European Pat. Off. . |
| 0099314 | 1/1984 | European Pat. Off. . |
| 1946518 | 3/1971 | Fed. Rep. of Germany ........ 56/315 |
| 1575089 | 7/1969 | France . |
| 2317869 | 2/1977 | France . |
| 2529743 | 1/1984 | France . |
| 1604341 | 12/1981 | United Kingdom . |

*Primary Examiner*—William L. Freeh
*Assistant Examiner*—Paul F. Neils
*Attorney, Agent, or Firm*—Marmorek, Guttman & Rubenstein

[57] ABSTRACT

A mowing machine for cutting crop comprises a chassis, cutting members supported by the chassis, and an intermediate structure on the chassis which at least partially supports the cutting members. The cutting members extend on both side of the intermediate structure. The mowing machine also comprises members, such as rotary drums or separating surfaces, which prevent attachment of the crop to the intermediate structure. In a preferred embodiment, the mowing machine further includes conditioning members so that the cutting members and conditioning members comprise a cutting-conditioning group.

84 Claims, 10 Drawing Figures

MOWING MACHINE FOR CUTTING HAY AND CEREAL GRASS

This is a continuation of application Ser. No. 716,178, filed Mar. 26, 1985, now abandoned.

BACKGROUND OF THE INVENTION

1. Field of the Invention

The present invention is concerned with mowers comprising cutting members supported by a chassis.

These mowers can additionally comprise supplementary working members such as, for example, conditioning means for cut crop.

Already known are mowers which have considerable working widths. At least a part of their working members generally extends substantially along the entire working width of the machine. Since these working members are relatively large and in general are relatively voluminous, they create problems in manufacture, storage and transport. But they also create problems with respect to the work obtained, for certain of these working members become less and less effective as their working width increases.

2. Object and Summary of the Invention

The present invention has for an object to provide a mower which does not present the drawbacks of prior art mowers while providing work of a satisfactory quality.

To this effect, the mower or reaper according to the invention is characterized by the fact that the chassis is equipped with an intermediate structure intended to at least partially support the cutting members which extend on each side of the said intermediate structure, and that in the vicinity of the intermediate structure are arranged means intended to prevent the attachment of crop to said intermediate structure.

In the case where the mower comprises supplementary working members, such as members for conditioning crop for example, the mower according to the invention is characterized by the fact that the chassis is also equipped with an intermediate structure intended for supporting at least in part the cutting members and/or the supplementary working members, said cutting members and said supplementary working members extending on either side of the intermediate structure. The mower is also characterized in that in the vicinity of the intermediate structure are arranged means intended to prevent the attachment of crop to said intermediate structure.

Thanks to the invention, the mower thus can have a considerable working width even though at least a part of its working parts (cutting means or supplementary working members) have a reduced length. These working parts thus can be made more easily. Moreover their storage and their transport, as well as the storage and the transport of the mowers becomes easier.

Also, the decrease in the quality of the work achieved by certain working parts whose working width is too large, is eliminated. In fact, even though the total working width of the mower be considerable, the working width of said working parts is relatively reduced.

Despite the presence of the itermediate structure which extends inside the work width defined by the cutting members extending on either side thereof, the mower can nevertheless, thanks to the invention, effect satisfactory performance.

In fact, to achieve this purpose, the invention provides means intended to prevent the attachment of crop to the intermediate structure. Thus, risks of lumps formed by the attachment of the crop to the intermediate structure are substantially decreased or eliminated.

According to one embodiment of the invention, the means intended to prevent the attachment of crop to the intermediate structure extend at least partially under the intermediate structure and advantageously near the front thereof.

According to another embodiment of the invention, the zone of action of the means intended to prevent attachment of crop to the intermediate structure is located at least partially in front of the cutting line of the cutting members.

Moreover, said means intended to prevent attachment of crop to the intermediate structure can, in accordance with the invention, extend at least in part in the vertical plane of symmetry of the intermediate structure.

According to another embodiment, said means can also extend at least partially on either side of the vertical plane of symmetry of the intermediate structure.

According to another characteristic of the invention, it is provided that the means intended to prevent attachment of crop to the intermediate structure are fixed on the mowing machine in such a way as to at least pivot upwardly. In this fashion, said means can adapt themselves to the topography of the terrain on which the machine operates. This makes it possible for said means to effect a satisfactory performance and not to be damdged by possible protuberances in the terrain.

According to an embodiment of the invention, it is provided that the pivoting of the means intended to prevent attachment of crop to the intermediate structure takes place about an axis directed transversally to the direction of operation of the machine.

Additionally, it is provided that the pivoting of said means can be prevented or is limited downwardly. This in particular makes it possible to maintain said means spaced apart from the soil during transportation.

According to an additional characteristic, it is also provided that the pivoting of said means is upwardly limited. This avoids interference between these means and parts of the mowing machine, interference which could cause damage in particular when said means are driven.

The means intended to prevent attachment of crop to the intermediate structure can additionally comprise in this invention members by means of which they can bear at least mementarily on the ground.

According to another characteristic of the invention, the means intended to prevent attachment of crop to the intermediate structure comprise means for entraining crop. These entraining means entrain crop which has been cut by the cutting members in such a way that it can be well laid out behind the cutting means or well taken up by additional working members.

According to an advantageous embodiment of the invention, the entraining means for the crop rotate about at least one axis which is upwardly directed. Advantageously also these means are arranged at least partially above at least one of the cutting means located near the intermediate structure. If this cutting means is rotary, these preferably rotate with this cutting means.

These means for entraining the crop thus are particularly efficient in freeing the crop which is present in front of the intermediate structure.

According to a preferred embodiment of a mower according to the invention, a cutting member extends on either side of the vertical plane of symmetry of the intermediate structure and substantially above each of these cutting members are arranged at least in part means for entraining crop.

Advantageously these means for entraining crop rotate substantially about the same axes as the cutting member above which they extend at least partially. Also advantageously it is provided in the invention that the means for entraining the crop rotate substantially at the same speed as the cutting member above which they extend at least in part.

According to an additional characteristic of the invention, the means for entraining the crop comprise at least one driven drum. Advantageously it is provided that the drum is provided with means which increases its performance. Advantageously also the drum can have the shape of a truncated cone.

According to another characteristic, the means intended to prevent attachment of crop to the intermediate structure comprise means for separating the crop. It is also perfectly possible that these means for separating crop be arranged on a mowing machine co-jointly with means for entraining the crop.

Advantageously these separating means extend preferably up to and past the front of the cutting line of the cutting members.

In this fashion, crop which is present in front of the intermediate structure can be separated before being cut by the cutting members.

According to an additional characteristic, the means for separating the crop comprise a cutting device.

According to one embodiment, it is provided that this cutting device is constituted by a knife whose cutting edge is forwardly directed.

According to another additional characteristic, the cutting device is driven. Advantageously this device comprises at least a series of moving teeth.

According to another additional characteristic, the means for separating the crop are constituted by at least one surface having a frontal edge.

Preferentially, the cutting edge of the knife, the series of teeth of the driven cutting device, or the frontal edge of the separating surfaces extends rearwardly and upwardly.

These separating means separate in particular stems of crop which are laid transversely to the operating direction of the mowing machine in the vicinity of the intermediate structure.

In the instance where the separating means comprise a cutting device, the stems of crop which are laid are cut in two. These stems separated or cut in two can then easily be cut by the cutting means which extend on both sides of the intermediate structure and be entrained to be deposited behind the cutting members or for take-up by additional working members without their being able to attach to the intermediate structure.

According to another characteristic, the means intended to prevent the attachment of crop to the intermediate structure comprise means for guiding the crop. Within the scope of the invention it is also possible that these guiding means be arranged on a mowing machine conjointly with means for entraining and/or separating the crop.

According to one embodiment, the guiding means are constituted by two non-horizontal surfaces which extend one near the other in the front part and which diverge rearwardly.

When the means for separating the crop comprise at least one separating surface, the guiding surfaces are advantageously substantially connected to the separating surfaces.

These guiding means for the crop properly channel crop on both sides of the intermediate structure in order that it be deposited behind the cutting means or be taken up by additional working members.

It is provided according to the invention that when the guiding means can pivot about an axis directed transversely to the operating direction of the mowing machine, the space between the guiding means and the intermediate structure be at least partially closed by closing means.

According to one embodiment, these closing means are constituted by two non-horizontal surfaces which extend one near the other in the front and which diverge rearwardly.

When the guiding means are constituted by two non-horizontal surfaces which extend one near the other in the front and which diverge towards the rear, the closing surfaces extend at least partially between these guiding surfaces.

According to another characteristic of the invention, the intermediate structure supports at least in part the means intended to prevent the attachment of crop to said intermediate structure.

According to an additional characteristic, the intermediate structure supports the beam which makes it possible to connect the mowing machine to a pulling vehicle.

According to another additional characteristic, the intermediate structure supports at least in part the mechanism which transmits motion.

The intermediate structure is thus a subassembly of a mowing machine on which has been assembled a large number of members which fulfill important functions.

BRIEF DESCRIPTION OF THE DRAWING

Other characteristics and advantages of the invention will appear from the following description of several non-limiting embodiments thereof in connection with the accompanying drawing wherein.

DESCRIPTION OF BEST MODES OF THE INVENTION

Figure 1:
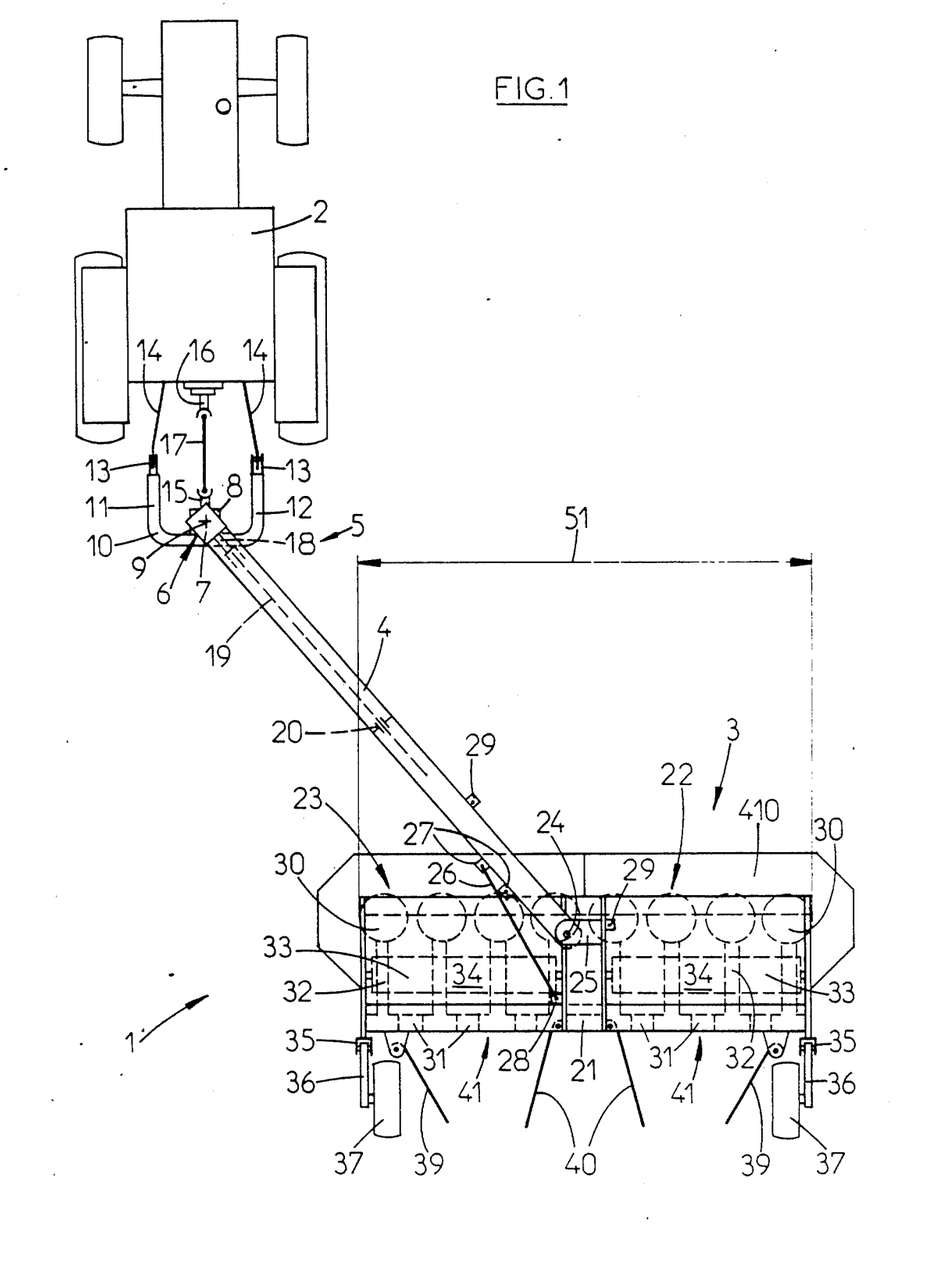
FIG. 1 shows a plan view of a mower-conditioner according to the invention.

FIG. 1 shows a mowing machine 1 according to the invention attached to a tractor 2. The machine 1 is composed of a body 3 and a beam 4. In its front part 5, the beam 4 has a transmission device 6 known to those skilled in the art. This transmission device comprises an upper housing 7 and a lower housing 8 which can rotate with respect to one another about an upwardly directed axis 9. The device 6 additionally includes a frame 10 rotatably connected to the lower housing 8. The frame 10 has at the free end of each of its branches 11, 12, a yoke 13 which makes it possible to connect frame 10 to the lower arms 14 of the tractor 2.

The lower housing 8 supports at least one input shaft 15 which is connected to the power take-off shaft 16 of tractor 2 by means of a shaft with universal joints 17, while the upper housing 7 supports an output shaft 18. Inside the transmission device 6 the one or several input shafts 15 are connected to the output shaft 18 by means of transmission means known to those skilled in the art.

Output shaft 18 transmits movement to the working members of machine 1 through the agency of a transmission shaft 19 rotatably connected to said output shaft 18. Preferably, the transmission shaft 19 is housed inside beam 4. Bearing in mind the considerable length of the transmission shaft 19, the same is maintained by beam 4 by means of at least one bearing 20.

The body 3 of machine 1 is constituted by three principal subassemblies: an intermediate structure 21 and two cutting groups 22, 23, located respectively, on each side of said intermediate structure 21.

At its rear extremity, beam 4 is connected to the intermediate structure 21 by means of a pivot whose axis 24 is upwardly directed. To this effect, the intermediate structure 21 comprises a yoke or connection 25.

By means of this pivot, beam 4 can pivot with respect to the intermediate structure 21 in such a way that it can assume different working positions and transport positions with respect to said intermediate structure 21.

The position of beam 4 with respect to the intermediate structure 21 is determined by means 26, 27, 28, 29, designed for that purpose.

Each cutting group 22, 23 comprises in non-limiting fashion, four cutting heads 30 which are each connected to a support 31 by means of an arm 32.

Figure 4:
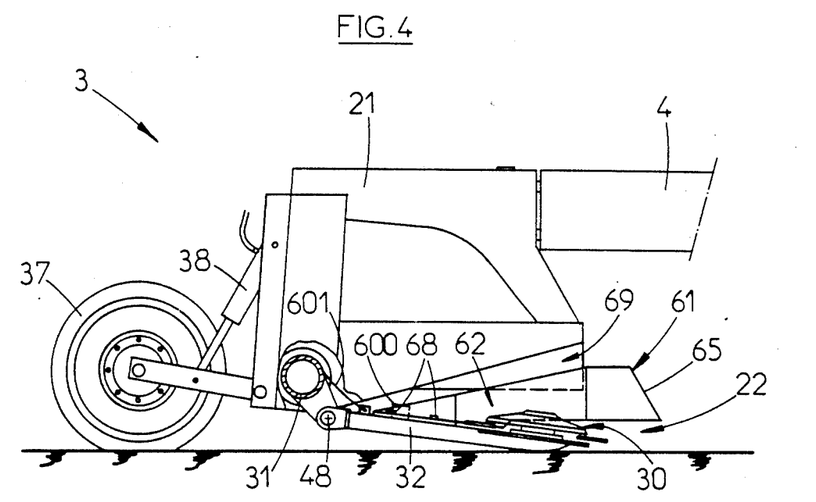
FIG. 4 is a side view of the mower-conditioner of FIG. 1, equipped with a second example of means intended to prevent the attachment of crop to the intermediate structure.
Figure 5:
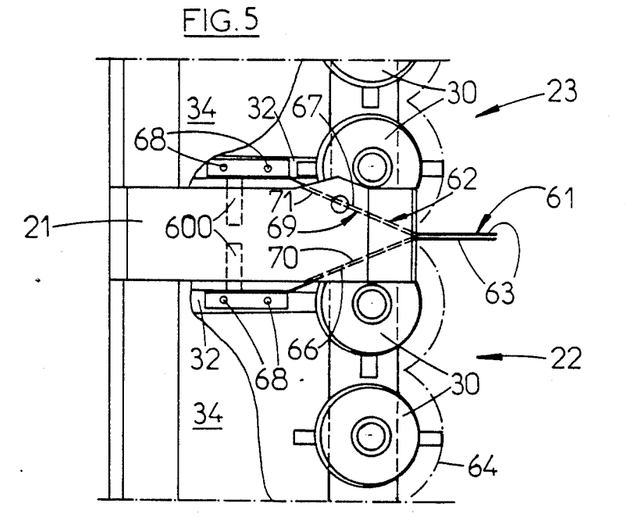
FIG. 5 is a partial view of the top of the body of the machine of FIG. 4.
Figure 6:
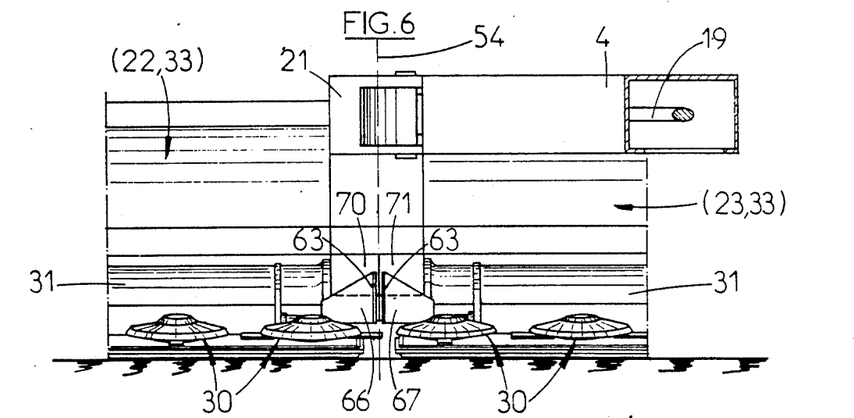
FIG. 6 is a partial view of the front of the body of the machine of FIGS. 4 and 5.

It is also possible within the scope of the invention that several cutting heads 30 be mutually connected and that the assembly of these cutting heads 30 be connected to support 31 by means of at least one arm 32 (see FIGS. 4, 5, 6). In FIG. 1 it is seen also that each cutting group 22, 23 additionally supports conditioning members 33. The assembly formed of cutting heads 30 and conditioning members 33 thus constitutes what is called a cutting-conditioning group.

Each cutting-conditioning group 22, 33 and 23, 33 extends under a cover 34. Behind its free end, each cutting-conditioning group 22, 33 and 23, 33 has a yoke 35 in which is pivoted an arm 36 at whose free end is fixed a wheel 37. Through these pivots, the position of each wheel 37 can be changed with respect to the cutting-conditioning group 22, 33 and 23, 33 corresponding thereto with the aid of retractable and extendable means 38 (see FIGS. 2, 4, 7, 9). This makes it possible to maintain the cutting-conditioning groups 22, 33 and 23, 33 near the ground during work and far from the ground when cutting must be interrupted or during transportation of the machine. Each cutting-conditioning group 22, 33 and 23, 33 additionally has in its rear part swathing means 39, 40 whose position is preferably adjustable with respect to the outlet opening 41 through which issues the harvested product. This adjustment of the position of the swathing devices 39, 40 makes it possible to calibrate the swath of the harvested product.

Each cutting-conditioning group 22, 33 and 23, 33 thus constitutes a unit of reduced width which is mounted on intermediate structure 21 with the aid of suitable means.

The assembly thus mounted and formed by the intermediate structure 21 and the cutting-conditioning groups 22, 33 and 23, 33, constitutes the body of the cutting machine which in this case is known as a mower-conditioner. The body 3 of this cutter rolls on the ground on wheels 37.

The rotary movement of the cutting heads 30 and of the conditioning members 33 is caused by the transmission shaft 19 and the transmission mechanism housed in the body 3 of the machine.

In FIG. 1 it is seen also that the machine has a protecting device 410 which brakes projections of hard bodies which can be hurled by cutting heads 30.

Figure 2:
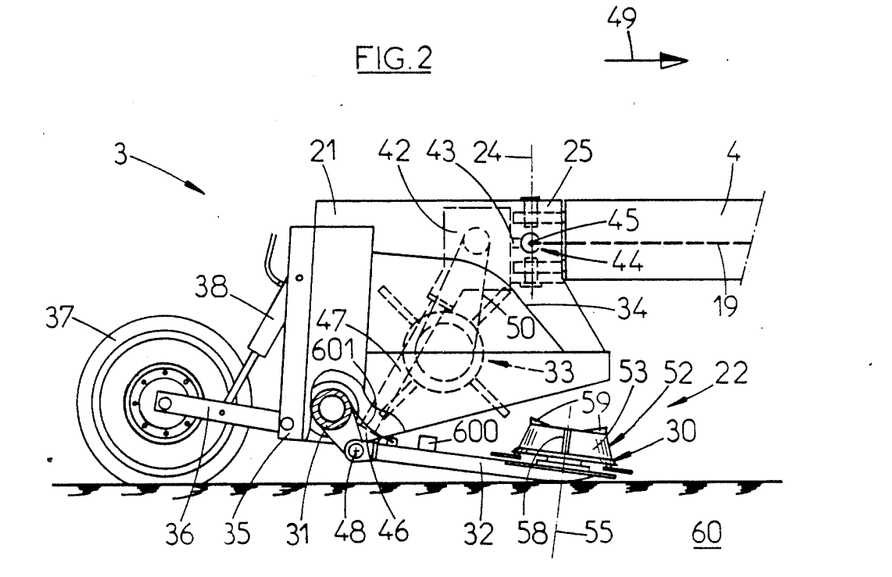
FIG. 2 is a side elevational view partly in section of the body of the machine of FIG. 1, equipped with a first example of means for preventing attachment of crop to the intermediate structure.

FIG. 2 shows a lateral view of the machine of FIG. 1. The protecting device 410 as well as the swathing devices 39, 40 have been left out to clarify the figure.

From this figure there is seen schematically the transmission mechanism housed in body 3 of the mower and supported by intermediate structure 21. This mechanism is composed first of all by an input housing 42 supporting an input shaft 43. The input shaft 43 is connected to the rear extremity of the transmission shaft 19 by means of universal joint 44 which is preferably homokinetic. The center 45 of joint 44 preferably is located substantially on the axis 24 about which beam 4 can pivot with respect to the intermediate structure 21. The input housing 42 drives a distribution housing 46 through the agency of a shaft housed inside a crosspiece tube 47 connecting the distribution housing 46 to the input housing 42. The distribution housing 46 distributes movement to the cutting heads 30 in particular by the agency of transmission means housed in the arms 32 and which drive the cutting heads 30 from below. These cutting heads are connected to support 31 in such a way as to pivot about an axis 48 directed transversely with respect to the working direction 49.

The input housing 42 also drives the conditioning members 33 through the agency of transmission organs such as, for example, chain 50.

As above said, the cutting-conditioning groups 22, 33 and 23, 33 extend on each side of intermediate structure 21. The latter is therefore inside the cutting width 51 (see FIG. 1) defined by the cutting groups 22, 23 in such a way that the crop must pass on both sides of said intermediate structure 21 to undergo the action of conditioning means 33 and to be deposited behind the machine.

In order that the crop cay properly pass on both sides of the intermediate structure 21, the invention provides means for preventing the attachment of crop to said intermediate structure 21.

Figure 3:
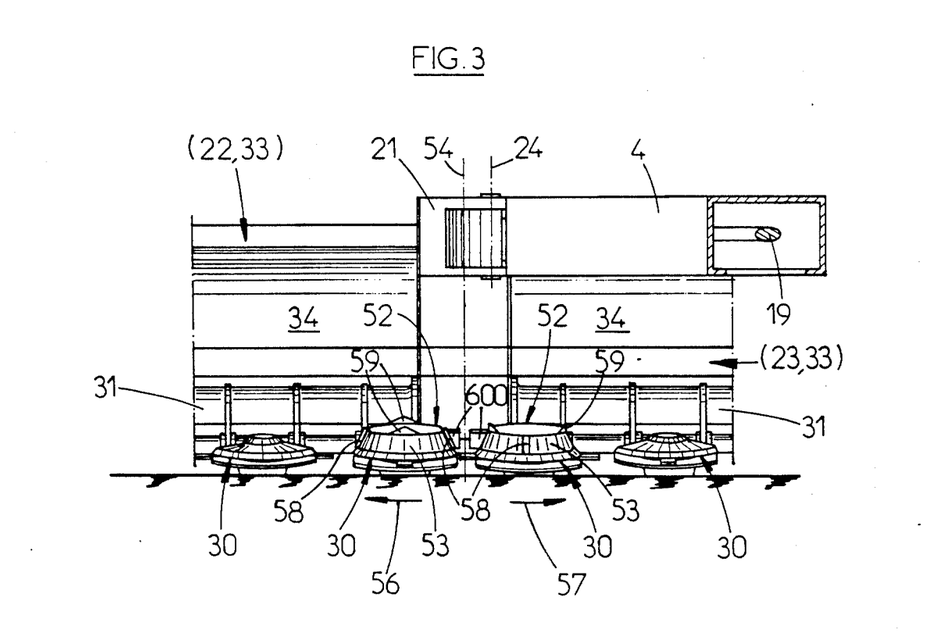
FIG. 3 is a partial view of the front of the body of the machine of FIG. 2.

In FIGS. 2 and 3 is shown a first embodiment of such means which comprise driven means for entraining crop 52. These means 52 are constituted by rotary drums 53 which in this example have the shape of a truncated cone. These drums extend above cutting heads 30 which extend near the intermediate structure 21 and which form part of cutting groups 22, 23, respectively.

In FIGS. 2 and 3 it is seen that drums 53 extend partly under intermediate structure 21 and near the front part thereof. Besides, drums 53 also extend on both sides of the vertical plane of symmetry 54 of the intermediate structure, as appears in FIG. 3.

The drums 53 are fixed on cutting heads 30 and rotate at the same speed and about the same axis of rotation 55 as said cutting heads 30. The direction of rotation of these cutting heads 30 and of drums 53 which surmount them, are indicated by the arrows 56, 57 and it is seen that the rotational directions diverge towards the front.

In order to increase the efficiency of drums 53, these are provided with projecting means which increase their effect by contacting the crop. These means, in the example shown, are constituted by small bars or teeth 58 which are arranged on the external surface of drums 53 and by tines or horns 59 arranged above said drums 53.

These means which are intended to prevent attachment of crop to intermediate structure 21 function in the following way.

The crop cut by cutting heads 30 located on both sides of the intermediate structure 21 is entrained by drums 53 which surmount them and in the direction of arrows 56 and 57. Thus, by looking at the machine from in front (see FIG. 3), the crop cut by cutting head 30 located near the intermediate structure 21 and pertaining to cutting group 22 is entrained towards the left of intermediate structure 21, while crop cut by cutting head 30 located near the intermediate structure 21 and pertaining to cutting group 23 is entrained towards the right of intermediate structure 21. In this fashion, the flow of crop cut by cutters 30 is split in two and each half of the flow passes near intermediate structure 21 without becoming attached thereto.

As stated above, the cutting heads 30 can pivot about axis 48 which is directed transversely to the working direction 49, in order to follow irregularities that may be present on the ground 60. In order that during upward pivoting the drums 53 do not collide with intermediate structure 21, the said pivoting of cutting heads 30 and therefore of drums 53 is upwardly limited by stops 600. These stops 600 are in the example shown constituted by pins which are fixed on arms 32 of the cutting members 30 which are located near intermediate structure 21 and extend therebelow. The pivoting of arms 32 corresponding to these cutting members is therefore stopped as soon as the pins touch the bottom of intermediate structure 21.

Pivoting of arms 32 is also limited downwardly by stops 601.

FIGS. 4, 5 and 6 show a second example of means intended to prevent the attachment of crop to the intermediate structure 21. These means are comprised of means 61 for separating crop and means 62 for guiding the crop.

The separating means 61 are constituted in this example by two surfaces 63 which extend essentially in front of the line of cutting of cutting heads 30. These separating surfaces 63 extend into a non-horizontal plane. (In this example they extend substantially in the vertical plane of symmetry 54 of the intermediate structure 21).

In the front, these separating surfaces 63 comprise a frontal edge 65 which extends upwardly and rearwardly.

The guiding means 62 are constituted in this example by two surfaces 66, 67 which are non-horizontal and which extend one near the other at the front and which diverge rearwardly. In this example, the two guiding surfaces 66, 67 extend in planes which are substantially vertical and symmetrical with respect to the vertical plane of symmetry 54 of the intermediate structure 21. In front, the guiding surfaces 66, 67 connect with separating surfaces 63.

The separating surfaces 63 are each consituted by a flat plate. These flat plates extend parallel and very near one to the other. The guiding surfaces 66, 67 are also each constituted by a flat plate. These guide plates each are connected in front to a separating plate. Each assembly of separating plate and guiding plate which is connected thereto is fixed by means of fastening means 68 on an arm 32 which connects the cutting heads to support 31. Each assembly of separating plate and guiding plate thus conjointly pivots with the arm 32 and cutting heads 30 fixed thereto. This prevents damage to these assemblies and makes it possible to maintain a relative position between these assemblies and cutting heads 30 during pivoting.

Additionally, in order that these assemblies and in particular the guiding surfaces 66, 67 do not hit the intermediate structure 21 when they pivot upwardly, the pivoting of arms 32 is limited upwardly by stops 600. As in the preceding example, the pivoting of arms 32 is also limited downwardly by stops 601. During this pivoting, these two separating plates remain substantially parallel to one another.

In order that too large a space not be formed between these means intended to prevent the attachment of crop to the intermediate structure 21, and the structure 21 when the cutting heads 30 have pivoted downwardly, the intermediate structure 21 has on its face facing the guiding surfaces 66, 67, means 69 constituted in this example by two surfaces 70, 71 which extend one near the other in front and which diverge rearwardly. These two surfaces 70, 71 extend substantially parallel to the guide surfaces 66, 67 and inside the corner formed by the latter.

This second example of means intended to prevent the attachment of crop to the intermediate structure 21 functions in the following manner.

The separating means 61 constituted by the separating surfaces 63 separate the crop before the same is cut by cutting heads 30 which extend near the intermediate structure 21. The stems of crop which then have their roots in the work zone of the cutting-conditioning group 22, 33 and their heads in the work zone of cutting-conditioning group 23, 33 and vice versa, are to a certain extent straightened before being cut by the cutting heads 30. This separation is facilitated by the fact that the frontal edge 65 is directed upwardly and rearwardly. The entrainment of the crop towards the rear is produced by the cutting heads 30 themselves and is facilitated by guiding means 62 constituted by guiding surfaces 66, 67, which properly channel the crop about the intermediate structure 21.

Figure 7:
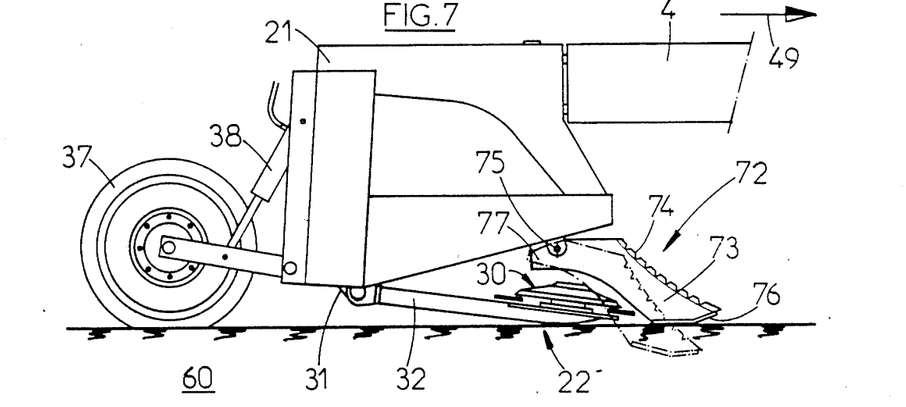
FIG. 7 is a lateral view of the body of the mower-conditioner of FIG. 1, equipped with a third example of means intended to prevent attachment of crop to the intermediate structure.
Figure 8:
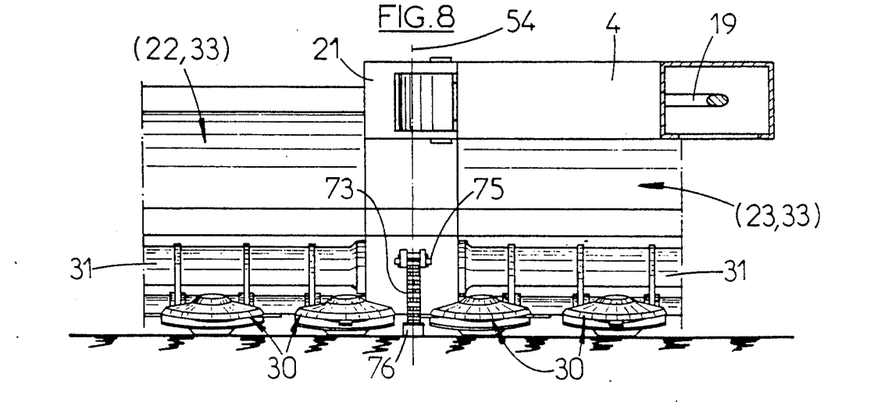
FIG. 8 is a partial view of the front of the body of the mower of FIG. 7.

FIGS. 7 and 8 show a third example of means intended to prevent attachment of crop to the intermediate structure 21. These means are constituted by a separating means 72 comprising a cutting device. This cutting device is constituted by a knife 73 whose cutting edge 74 is directed towards the front. This cutting edge 74 extends also rearwardly and upwardly and is located substantially in front of the cutting line of the cutting heads 30. It is also located substantially within the vertical plane of symmetry 54 of the intermediate structure 21 between the two cutting heads 30 arranged in the vicinity of the intermediate structure 21.

The knife 73 is secured on intermediate structure 21 by means of a pivoting shaft 75 directed transversely to the working direction 49. The knife 73 additionally bears on the ground 60 through a sliding member 76 whose front part is upwardly directed. By means of this sliding organ 76, the knife 73 can follow irregularities on the soil without being damaged.

In order to limit the pivoting of knife 73 towards the bottom when it passes above a hole or when the body 3 of the machine is lifted, knife 73 is provided with an projection 77 which contacts intermediate structure 21 when the limiting angle of downward pivoting is reached (the lowered position in the extreme cases of knife 73 has been shown by dots and dashes).

This means for preventing attachment of crop to the intermediate structure 21 functions in the following manner.

The cutting edge 74 separates stems of laid crop which are present in front of the intermediate structure 21 by cutting them in two. The cutting heads 30 then can cut these stems and entrain them easily towards the rear without said stems becoming attached to the intermediate structure 21.

Figure 9:
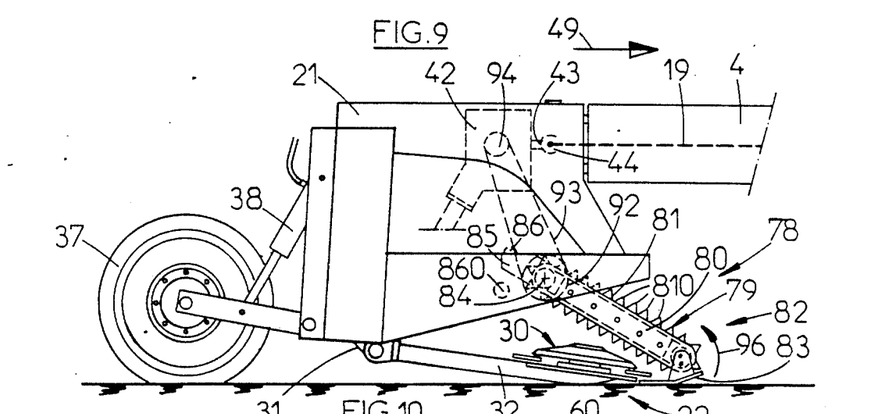
FIG. 9 is a lateral view of the body of the mower-conditioner of FIG. 1, equipped with a fourth example of means intended to prevent the attachment of crop to the intermediate structure.
Figure 10:
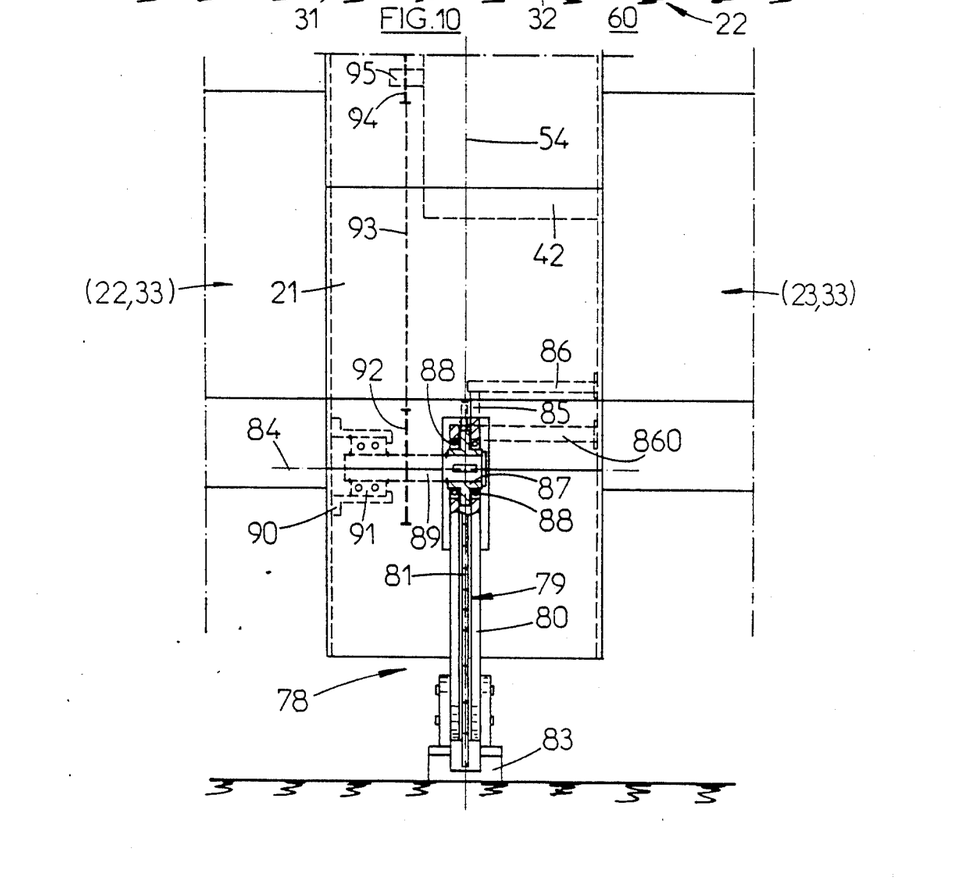
FIG. 10 is a partial view of the front of the intermediate structure of the cutter of FIG. 9, shown on an enlarged scale.

FIGS. 9 and 10 show a fourth example of means intended to prevent the attachment of crop to the intermediate structure 21. These means are constituted by separating means 78 comprising a driven cutting device. This driven cutting device is constituted by a saw 79.

This saw 79 is constituted by a plate 80 on which turns an endless chain 81 which comprises a series of teeth 810.

The saw 79 extends substantially in the vertical plane of symmetry 54 of the intermediate structure 21. The front part 82 of plate 80 on which winds the endless chain 81 equipped with teeth 810, extends in front of the line of cutting heads 30. This front part 82 is provided with a sliding member 83 by the agency of which the saw 79 bears on the ground 60. This sliding member 83 is arranged in such a way that it does not prevent the saw 79 from cutting in the front part 82 thereof.

The rear part of the saw 79 penetrates inside the intermediate structure 21 and is connected thereto by means of a pivoting shaft 84 which is directed transversely to the working direction 49. The plate 80 comprises an a projection 85 which impacts on a stop 86 integral with the intermediate structure 21. The stop 86 can be adjusted to define the normal working position of the saw 79. After this adjustment, the saw 79 can only pivot upwardly about the shaft 84. The stop 86 thus prevents downward pivoting of the saw 79. The intermediate structure 21 is provided additionally with a second stop 860 which conjointly with projection 85 limits the upward pivoting of the saw 79. This prevents interference between the saw 79 and the intermediate structure 21.

In its rear part, the saw 79 has a pinion 87 for driving the endless chain 81 which turns about axis 84, about which the saw 79 pivots. To this effect the rear extremity of plate 80 forms a yoke in which pinion 87 is guided rotationally by means of two rollers 88. Pinion 87 is additionally rotatably connected and translationally connected to the extremity of a shaft 89 whose longitudinal axis coincides with shaft 84. The other end of shaft 89 is rotationally guided in bearing 90 by means of rollers 91 and is translationally connected to this bearing 90 which is itself rigidly connected to the intermediate structure 21.

Between pinion 87 and bearing 90, the shaft 89 is rotationally connected to a wheel 92 on which winds an endless transmission member 93. This endless transmission member 93 winds on another wheel 94 rotationally connected to an outward shaft 95 of input housing 42. The driving of pinion 87 takes place in such a way that the endless chain 81 with teeth 810 rotates in the direction indicated by arrow 96.

With this type of construction, it is seen that saw 79 can pivot about shaft 84 to follow irregularities on the ground 60 without perturbation of the continuous driving of the endless chain 81 which has teeth 810.

The separating means 78 with the cutting device which has just been described, functions in the same way as that of FIGS. 7 and 8, except that cutting takes place by a driven cutting device.

Since the endless chain 81 with teeth 810 rotates in the direction of arrow 96, that is in its zone of cutting, rearwardly and upwardly, the cutting and straightening effect on the laid stems of crop is more efficient.

While in the above description there have been described four examples of means intended to prevent attachment of crop to the intermediate structure 21, it will be understood that the scope of the invention will not be avoided by combining therebetween two or more of these examples.

Similarly, the scope of the invention will not be avoided by various modifications or improvements brought about in these embodiments.

What is claimed is:

1. A mowing machine comprising in combination:
   a chassis,
   cutting means supported by said chassis,
   an intermediate structure on said chassis, said intermediate structure at least partially supporting said cutting means, said cutting means extending on both sides of said intermediate structure,
   supporting wheels on said chassis for supporting said chassis on the ground, said supporting wheels being mounted on said chassis in a pivotable manner, and maneuvering means able to modify the position of said supporting wheels in relation to said chassis,
   a beam fixed on said chassis by means of an upwardly directed axis to connect said mowing machine to a pulling vehicle, said beam being pivotable about said upwardly directed axis, so as to occupy different positions in relation to said chassis,
   driving means to drive the cutting means, and
   means associated with said intermediate structure for preventing attachment of crop to said intermediate structure.

2. Machine according to claim 1, wherein said means for preventing attachment of crop to said intermediate structure extend at least partially under said intermediate structure.

3. Machine according to claim 1, wherein said means for preventing attachment of crop to said intermediate structure extend near the front of said intermediate structure.

4. Machine according to claim 1, wherein said means for preventing attachment of crop to said intermediate structure are located at least partially in front of the cutting line of said cutting members.

5. Machine according to claim 1, wherein said means for preventing attachment of crop to said intermediate structure extend at least substantially in part in the vertical plane of symmetry of said intermediate structure.

6. Machine according to claim 1, wherein said means for preventing attachment of crop to said intermediate structure extend at least substantially in part on each side of the vertical plane of symmetry of said intermediate structure.

7. Machine according to claim 1, wherein said intermediate structure at least in part supports said means for preventing attachment of crop to said intermediate structure.

8. Machine according to claim 1, wherein said intermediate structure supports a beam for connecting said machine to a pulling vehicle.

9. Machine according to claim 1, wherein said intermediate structure supports at least a part of a transmission housed in the body of said machine.

10. Machine according to claim 1, wherein at least one of said cutting means is driven from the bottom thereof.

11. Machine according to claim 1, wherein said means for preventing attachment of crop to said intermediate structure are secured to said machine in such a way as to at least move upwardly.

12. Machine according to claim 11, wherein said means for preventing attachment of crop to said intermediate structure pivot about an axis directed transversely to the working direction of said machine.

13. Machine according to claim 11, wherein the movement of said means for preventing attachment of crop to said intermediate structure is downwardly limited or stopped in that direction.

14. Machine according to claim 11, wherein upwardly movement of said means for preventing attachment of crop to said intermediate structure is limited.

15. Machine according to claim 11, wherein said means for preventing attachment of crop to said intermediate structure further include means for bearing at least momentarily on the ground.

16. Machine according to claim 1, wherein said means for preventing attachment of crop to said intermediate structure comprise means for guiding crop.

17. Machine according to claim 16, wherein said guiding means comprise two non-horizontal surfaces, said surfaces extending one near the other in the front thereof and diverging in their rear part.

18. Machine according to claim 17, wherein said means for preventing attachment of crop comprise crop separating surfaces, and wherein the guiding surfaces in the front thereof are substantially connected to said separating surfaces.

19. Machine according to claim 16, wherein said guiding means move upwardly and downwardly, and there being a space between said guiding means and said intermediate structure, and means for at least partially closing said space.

20. Machine according to claim 19, wherein said closing means consist of two non-horizontal surfaces, said surfaces extending one near the other in the front thereof and diverging in the rear part thereof.

21. Machine according to claim 20, wherein said guiding means comprises two non-horizontal guiding surfaces which extend one near the other in the front thereof and diverge in their rear part, and wherein said closing surfaces extend at least partially between said guiding surfaces.

22. Machine according to claim 1, wherein said means for preventing attachment of crop to said intermediate structure comprise driven means for entraining crop.

23. Machine according to claim 22, wherein said driven means for entraining crop rotate about at least one upwardly directed shaft.

24. Machine according to claim 22, wherein said means for entraining crop comprise at least one driven drum.

25. Machine according to claim 24, wherein said drum has projecting means for contacting said crop.

26. Machine according to claim 24, wherein said drum has the shape of a truncated cone.

27. Machine according to claim 22, wherein said driven means for entraining crop are arranged at least partially above at least one of said cutting means located near said intermediate structure.

28. Machine according to claim 27, wherein one cutting means extends on each side of the vertical plane of symmetry of the intermediate structure and that substantially above each of said cutting means are arranged at least in part driven means for entraining crop.

29. Machine according to claim 27, wherein said one cutting means is rotary and said driven means for entraining crop rotate with said cutting means above which said means being at least partially arranged.

30. Machine according to claim 29, wherein said driven means for entraining crop rotate at least partially about the same axis as said cutting means above which said means extending at least partially.

31. Machine according to claim 29, wherein said driven means for entraining crop rotate substantially at the same speed as said cutting means.

32. Machine according to claim 1, wherein said means for preventing attachment of crop to the intermediate structure comprise means for separating said crop.

33. Machine according to claim 32, wherein said means for separating said crop extend up to and past the front of the line of cutting of said cutting means.

34. Machine according to claim 32, wherein said means for separating said crop are connected to the cutting means which being located in the vicinity of said intermediate structure, and being able to move upwardly and downwardly with said cutting means.

35. Machine according to claim 32, wherein said means for separating crop are constituted by at least one surface having a frontal edge.

36. Machine according to claim 35, wherein said frontal edge extends rearwardly and upwardly.

37. Machine according to claim 32, wherein said means for separating crop comprise a cutting device.

38. Machine according to claim 37, wherein said means for separating crop are constituted by a knife, said knife having a cutting edge forwardly directed.

39. Machine according to claim 38, wherein said cutting edge extends rearwardly and upwardly.

40. Machine according to claim 37, wherein said cutting device is driven.

41. Machine according to claim 40, wherein said driven cutting device comprises at least one series of driven teeth.

42. Machine according to claim 41, wherein said teeth extend rearwardly and upwardly.

43. A mowing machine comprising in combination:
a chassis,
cutting means supported by said chassis,
supplementary working member supported by said chassis,
an intermediary structure on said chassis, said intermediate structure at least partially supporting said cutting means and/or said supplementary working members, said cutting means and/or said supplementary working members extending on both sides of said intermediate structure,
supporting wheels on said chassis for supporting said chassis on the ground, said supporting wheels being mounted on said chassis in a pivotable manner, and maneuvering means able to modify the position of said supporting wheels in relation to said chassis,
a beam fixed on said chassis by means of an upwardly directed axis to connect said mowing machine to a pulling vehicle, said beam being pivotable about said upwardly directed axis, so as to occupy different positions in relation to said chassis,
driving means to drive the cutting means and/or the supplementary working members, and
means associated with said intermediate structure for preventing attachment of crop to said intermediate structure.

44. Machine according to claim 43, wherein said means for preventing attachment of crop to said intermediate structure extend at least partially under said intermediate structure.

45. Machine according to claim 43, wherein said means for preventing attachment of crop to said intermediate structure extend near the front of said intermediate structure.

46. Machine according to claim 43, wherein said means for preventing attachment of crop to said intermediate structure are located at least partially in front of the cutting line of said cutting members.

47. Machine according to claim 43, wherein said means for preventing attachment of crop to said intermediate structure extend at least in part in the vertical plane of symmetry of said intermediate structure.

48. Machine according to claim 43, wherein said means for preventing attachment of crop to said intermediate structure extend at least in part on each side of the vertical plane of symmetry of said intermediate structure.

49. Machine according to claim 43, wherein said intermediate structure at least in part supports said means for preventing attachment of crop to said intermediate structure.

50. Machine according to claim 43, wherein said intermediate structure supports a beam for connecting said machine to a pulling vehicle.

51. Machine according to claim 43, wherein said intermediate structure supports at least a part of a transmission housed in the body of said machine.

52. Machine according to claim 43, wherein at least one of said cutting means is driven from the bottom thereof.

53. Machine according to claim 43, wherein said means for preventing attachment of crop to said intermediate structure are secured to said machine in such a way as to at least move upwardly.

54. Machine according to claim 53, wherein said means for preventing attachment of crop to said intermediate structure pivot about an axis directed transversely to the working direction of said machine.

55. Machine according to claim 53, wherein the movement of said means for preventing attachment of crop to said intermediate structure are downwardly limited or stopped in that direction.

56. Machine according to claim 53, wherein upwardly movement of said means for preventing attachment of crop to said intermediate structure is limited.

57. Machine according to claim 53, wherein said means for preventing attachment of crop to said intermediate structure further include means for bearing at least momentarily on the ground.

58. Machine according to claim 43, wherein said means for preventing attachment of crop to said intermediate structure comprise means for guiding crop.

59. Machine according to claim 58, wherein said guiding means comprise two non-horizontal surfaces, said surfaces extending one near the other in the front thereof and diverging in their rear part.

60. Machine according to claim 59, wherein said means for preventing attachment of crop comprise crop separating surfaces, and wherein the guiding surfaces in the front thereof are substantially connected to said separating surfaces.

61. Machine according to claim 58, wherein said guiding means moves upwardly and downwardly, and there being a space between said guiding means and said intermediate structure, and means for at least partially closing said space.

62. Machine according to claim 61, wherein said closing means consists of two non-horizontal surfaces, said surfaces extending one near the other in the front thereof and diverging in the rear part thereof.

63. Machine according to claim 62, wherein said guiding means comprise two non-horizontal guiding surfaces which extend one near the other in the front thereof and diverge in their rear part, and wherein said closing surfaces extend at least partially between said guiding surfaces.

64. Machine according to claim 43, wherein said means for preventing attachment of crop to said intermediate structure comprise driven means for entraining crop.

65. Machine according to claim 64, wherein said driven means for entraining crop rotate about at least one upwardly directed shaft.

66. Machine according to claim 64, wherein said means for entraining crop comprise at least one driven drum.

67. Machine according to claim 66, wherein said drum has projecting means for contacting said crop.

68. Machine according to claim 66, wherein said drum has the shape of a truncated cone.

69. Machine according to claim 64, wherein said driven means for entraining crop are arranged at least partially above at least one of said cutting means located near said intermediate structure.

70. Machine according to claim 69, wherein said one cutting means is rotary and said driven means for entraining crop rotate with said cutting means above which said means being at least partially arranged.

71. Machine according to claim 69, wherein one cutting means extends on each side of the vertical plane of symmetry of the intermediate structure and that substantially above each of said cutting means are arranged at least in part driven means for entraining crop.

72. Machine according to claim 71, wherein said driven means for entraining crop rotate at least partially about the same axis as said cutting means above which said means extending at least partially.

73. Machine according to claim 71, wherein said driven means for entraining crop rotate substantially at the same speed as said cutting means.

74. Machine according to claim 43, wherein said means for preventing attachment of crop to the intermediate structure comprise means for separating said crop.

75. Machine according to claim 74, wherein said means for separating said crop extend up to and past the front of the line of cutting of said cutting means.

76. Machine according to claim 74, wherein said means for separating said crop are connected to the cutting means are located in the vicinity of said intermediate structure, and are able to move upwardly and downwardly with said cutting means.

77. Machine according to claim 74, wherein said means for separating crop are constituted by at least one surface having a frontal edge.

78. Machine according to claim 77, wherein said frontal edge extends rearwardly and upwardly.

79. Machine according to claim 74, wherein said means of separating crop comprise a cutting device.

80. Machine according to claim 79, wherein said means for separating crop are constituted by a knife, said knife having a cutting edge forwardly directed.

81. Machine according to claim 80, wherein said cutting edge extends rearwardly and upwardly.

82. Machine according to claim 79, wherein said cutting device is driven.

83. Machine according to claim 82, wherein said driven cutting device comprises at least one series of driven teeth.

84. Machine according to claim 83, wherein said teeth extend rearwardly and upwardly.

* * * * *